(12) United States Patent
Yang et al.

(10) Patent No.: US 10,225,807 B2
(45) Date of Patent: Mar. 5, 2019

(54) COMMUNICATION METHOD AND SYSTEM (71) Applicant: HARMAN INTERNATIONAL INDUSTRIES, INCORPORATED, Stamford, CT (US)

(72) Inventors: Zeng Yang, Shanghai (CN); Qingshan Zhang, Shanghai (CN); Jianjun Ma, Shanghai (CN); Guoxia Zhang, Shanghai (CN)

( * ) Notice: Subject to any disclaimer, the term of this patent is extended or adjusted under 35 U.S.C. 154(b) by 0 days.

(21) Appl. No.: 15/997,629

(22) Filed: Jun. 4, 2018

(65) Prior Publication Data

US 2018/0288712 A1 Oct. 4, 2018

Related U.S. Application Data (62) Division of application No. 15/024,227, filed as application No. PCT/CN2014/086299 on Sep. 11, 2014, now Pat. No. 10,009,855.

(30) Foreign Application Priority Data

Oct. 14, 2013 (WO) ................ PCT/CN2013/085160

(51) Int. Cl.
*H04W 72/00* (2009.01)
*H04W 52/28* (2009.01)
(Continued)

(52) U.S. Cl.
CPC ......... *H04W 52/281* (2013.01); *H04W 4/046* (2013.01); *H04W 4/40* (2018.02)

(58) Field of Classification Search
CPC ..... H04W 52/62; H04W 52/281; H04W 4/40; H04W 52/00; H04W 52/225; H04W 52/282; H04W 52/285
(Continued)

(56) References Cited

U.S. PATENT DOCUMENTS 5,896,374 A 4/1999 Okumura et al.
2005/0238051 A1 10/2005 Yi et al.
(Continued)

FOREIGN PATENT DOCUMENTS

CN 1365208 A 8/2002
CN 1694390 A 11/2005
(Continued)

OTHER PUBLICATIONS

Boppana, et al. "Superposition Coding in the Downlink of COMA Cellular Systems" Published in Wireles Communications and Networking Group, University of Florida, Feb. 13, 2006 {34 pages).
(Continued)

*Primary Examiner* — Shaima Q Aminzay (57) ABSTRACT

Methods and systems for communicating a message through a communication network are provided. A method for receiving a message through a communication network is provided, where the message is partitioned into at least two parts each of which is carried in a corresponding modulated part of a first modulated signal frame, and the at least two modulated parts of the first modulated signal frame have different power levels, the method including: receiving the first modulated signal frame; obtaining control information of the message from the first modulated signal frame; and obtaining the message carried in the first modulated signal frame based on the control information.

6 Claims, 6 Drawing Sheets (51) Int. Cl.
*H04W 4/04* (2009.01)
*H04W 4/40* (2018.01)

(58) Field of Classification Search
USPC .......................................... 455/522
See application file for complete search history.

(56) References Cited

U.S. PATENT DOCUMENTS

2006/0153315 A1* 7/2006 Chen .................. H04B 7/18515
375/295
2007/0076677 A1 4/2007 Batariere et al.
2008/0123578 A1 5/2008 Von Elbwart et al.
2010/0277368 A1 11/2010 Ponnuswamy

FOREIGN PATENT DOCUMENTS

| CN | 1723651 A | 1/2006 |
|----|-----------|--------|
| CN | 1938969 A | 3/2007 |
| EP | 1 475 924 A1 | 11/2004 |
| WO | 2004/001988 A2 | 12/2003 |
| WO | 2004/040403 A2 | 5/2004 |
| WO | 2011/103476 A1 | 8/2011 |

OTHER PUBLICATIONS

Cai, Lin, et al. "Scalable modulation for scalable wireless videocast." INFOCOM, 2010 Proceedings IEEE. IEEE, 2010 (5 pages).

* cited by examiner

FIG. 1

```
BasicSafetyMessage ::= SEQUENCE {
  -- Header items
  msgID    DSRCmsgID,           -- 1 byte -- Part I, sent as a single octet blob
  blob1    BSMblob, --
  -- The blob consists of the following 37 packed bytes:
  --
  -- msgCnt   MsgCount,          -x- 1 byte
  -- id       TemporaryID,       -x- 4 bytes
  -- secMark  DSecond,           -x- 2 bytes -- pos      PositionLocal3D,
     -- lat      Latitude,       -x- 4 bytes
     -- long     Longitude,      -x- 4 bytes
     -- elev     Elevation,      -x- 2 bytes
     -- accuracy PositionalAccuracy, -x- 4 bytes -- motion   Motion,
     -- speed    Speed,          -x- 2 bytes
     -- heading  Heading,        -x- 2 byte
     -- accelSet AccelerationSet4Way, -x- 7 bytes -- control  Control,
  -- brakes   BrakeSystemStatus, -x- 2 bytes -- basic    VehicleBasic,
  -- size     VehicleSize,       -x- 3 bytes

... -- # LOCAL_CONTENT
}
```

FIG. 2

```
BasicSafetyMessage ::= SEQUENCE {
  -- Header items
  msgID      DSRCmsgID,           -- 1 byte -- Part I, sent as a single octet blob
  blob1      BSMblob, --
  -- The blob consists of the following 18 packed bytes:
  --
  -- id       TemporaryID,        -x- 4 bytes -- pos      PositionLocal3D,
    -- lat      Latitude,         -x- 4 bytes
    -- long     Longitude,        -x- 4 bytes
    -- elev     Elevation,        -x- 2 bytes
    -- accuracy PositionalAccuracy, -x- 4 bytes

... -- # LOCAL_CONTENT
}
```

FIG. 3

```
BasicSafetyMessage ::= SEQUENCE {
  -- Part I, sent as a single octet blob
  blob1      BSMblob, --
  -- The blob consists of the following 19 packed bytes:
  --
  -- msgCnt   MsgCount,           -x- 1 byte
  -- secMark  DSecond,            -x- 2 bytes -- motion   Motion,
    -- speed    Speed,            -x- 2 bytes
    -- heading  Heading,          -x- 2 byte
    -- accelSet AccelerationSet4Way, -x- 7 bytes -- control  Control,
  -- brakes   BrakeSystemStatus,  -x- 2 bytes -- basic    VehicleBasic,
  -- size     VehicleSize,        -x- 3 bytes

... -- # LOCAL_CONTENT
}
```

COMMUNICATION METHOD AND SYSTEM

CROSS-REFERENCE TO RELATED APPLICATIONS

This application is a divisional of the co-pending U.S. patent application titled, "COMMUNICATION METHOD AND SYSTEM," filed on Mar. 24, 2016 and having Ser. No. 15/024,227, which is a national stage application of the international application titled, "COMMUNICATION METHOD AND SYSTEM," filed on Sep. 11, 2014 and having application number PCT/CN2014/086299. This international application claims priority to the international patent application titled, "COMMUNICATION METHOD AND SYSTEM," filed on Oct. 14, 2013 and having application number PCT/CN2013/085160. The subject matter of these related applications is hereby incorporated herein by reference.

TECHNICAL FIELD

The present disclosure generally relates to communication methods and systems.

BACKGROUND

In modern communication technology, how to alleviate channel congestion is one of the major concerns. In conventional communication methods, transmit data rate control (TDRC) is used to reduce the channel load by applying a high-order modulation scheme. However, high-order modulation may lead to low reliability.

SUMMARY

According to one embodiment, a method for transmitting a message through a communication network is provided. The method may include: partitioning the message into at least two parts; generating at least two bit sequences each of which carries a corresponding part of the message; modulating the at least two bit sequences to form a modulated signal frame which includes at least two modulated parts corresponding to the at least two bit sequences, respectively, where the at least two modulated parts of the modulated signal frame have different power levels; and transmitting the modulated signal frame through the communication network.

In some embodiments, partitioning the message may include: determining type of the message; selecting a partition scheme based on the type of the message; and partitioning the message into the at least two parts according to the selected partition scheme. In some embodiments, the partition scheme of the message may be selected based on the type of the message and a configuration file which lists out various message types and their corresponding partition schemes.

In some embodiments, the at least two parts of the message may be appended with corresponding at least two parts of header data, respectively, and the at least two parts of the message appended with the at least two parts of the header data may be encoded to obtain the at least two bit sequences.

In some embodiments, modulating the at least two bit sequences may include: modulating the at least two bit sequences separately to obtain the at least two modulated parts having different power levels; and combining the at least two modulated parts into the modulated signal frame.

In some embodiments, the at least two bit sequences may be modulated using an unequal error protection method.

In some embodiments, the communication network is a vehicular communication network and the message is a basic safety message (BSM), the at least two bit sequences may include a first bit sequence and a second bit sequence, the first bit sequence may carry position information, and the at least two modulated parts of the modulated signal frame may include a first modulated part corresponding to the first bit sequence and a second modulated part corresponding to the second bit sequence, where the first modulated part has a power level higher than that of the second modulated part.

In some embodiments, transmitting the modulated signal frame through the communication network may include: transforming the modulated signal frame from frequency domain into time domain to obtain a time domain discrete signal frame; transforming the time domain discrete signal frame into a time domain continuous signal frame; and transmitting the time domain continuous signal frame at a predetermined frequency.

In some embodiments, the modulated signal frame may carry information indicating that the modulated signal frame includes at least two modulated parts corresponding to at least two parts of the message and having different power levels.

In some embodiments, the modulated signal frame may carry a physical layer convergence protocol (PLCP) header in which a "Reserved" field may be used to indicate whether the modulated signal frame includes at least two modulated parts corresponding to at least two parts of the message and having different power levels.

In some embodiments, a "RATE" field of the PLCP header may include data indicating coding rate of the first bit sequence.

According to one embodiment, a method for receiving a message through a communication network is provided. The message is partitioned into at least two parts each of which is carried in a corresponding modulated part of a first modulated signal frame; and the at least two modulated parts of the first modulated signal frame have different power levels. The method may include: receiving the first modulated signal frame; obtaining control information of the message from the first modulated signal frame; and obtaining the message carried in the first modulated signal frame based on the control information, which includes: demodulating and decoding the first modulated signal frame as it only has one modulated part to obtain a first part of the message; encoding and modulating the first part of the message to obtain a second modulated signal frame; demodulating and decoding a third modulated signal frame which is a difference between the first modulated signal frame and the second modulated signal frame; as the third modulated signal frame has only one modulated part, to obtain a second part of the message; and repeating the above processes for a corresponding number of times until all the at least two parts of the message are obtained, where the corresponding number may be determined based on the control information.

In some embodiments, the control information may include the number of the at least two parts of the message, types of data respectively contained in the at least two parts of the message, power levels respectively corresponding to the at least two parts of the message, and the like.

In some embodiments, the method may further include: determining whether each of the obtained at least two parts of the message has an error; if none of the obtained at least two parts of the message is determined to have an error, combining the obtained at least two parts of the message based on the control information; and transmitting a combination result to an application layer. In some embodiments, if one of the at least two parts of the message is determined to have an error, the rest part of the message which is determined to have no error may be transmitted to the application layer. Based on the control information, type of data transmitted to the application message may be recognized.

In some embodiments, the communication network is a vehicular communication network, the control information of the message may be obtained based on information in a PLCP header which may be partially carried in a "SIGNAL" part of the first modulated signal frame.

In some embodiments, the control information of the message may be obtained based on type of the message and a configuration file listing out various message types and their corresponding control information.

In some embodiments, the method may further include: determining whether the message is partitioned into at least two parts based on a "Reserved" field of the PLCP header; and if yes, performing the above described processes to obtain the at least two parts of the message.

In some embodiments, the third modulated signal frame may be obtained based on vector subtraction between the first modulated signal frame and the second modulated signal frame.

According to one embodiment, a system for transmitting a message through a communication network is provided. The system may include: a processor for partitioning the message into at least two parts and generating at least two bit sequences each of which carries a corresponding part of the message; a modulator for modulating the at least two bit sequences to form a modulated signal frame which includes at least two modulated parts corresponding to the at least two bit sequences, respectively, where the at least two modulated parts of the modulated signal frame have different power levels; and a transmitter for transmitting the modulated signal frame through the communication network.

In some embodiments, the processor may be configured to: determine type of the message; select a partition scheme based on the type of the message; partition the message according to the selected partition scheme to obtain the at least two parts of the message; and control an encoder to encode the at least two parts of the message to obtain the at least two bit sequences. In some embodiments, the processor may be configured to select the partition scheme based on the type of the message and a configuration file which lists out various message types and their corresponding partition schemes.

In some embodiments, the processor may be configured to: append the at least two parts of the message with corresponding at least two parts of header data, respectively; and control an encoder to encode the at least two parts of the message appended with the at least two parts of the header data to obtain the at least two bit sequences.

In some embodiments, the modulator may be configured to: modulate the at least two bit sequences separately to obtain the at least two modulated parts having different power levels; and combine the at least two modulated parts into the modulated signal frame. In some embodiments, the modulator may be configured to modulate the at least two bit sequences using an unequal error protection method.

In some embodiments, the communication network is a vehicular communication network and the message is a basic safety message, the processor may be configured to generate the at least two bit sequences to include a first bit sequence and a second bit sequence, where the first bit sequence may carry position information, the at least two modulated parts of the modulated signal frame may include a first modulated part corresponding to the first bit sequence and a second modulated part corresponding to the second bit sequence, where the first modulated part has a power level higher than that of the second modulated part.

In some embodiments, the modulator may be configured to transform the modulated signal frame from frequency domain into time domain to obtain a time domain discrete signal frame and transform the time domain discrete signal frame into a time domain continuous signal frame; and the transmitter may be configured to transmit the time domain continuous signal frame at a predetermined frequency.

In some embodiment, the modulated signal frame may carry information indicating that the modulated signal frame includes at least two modulated parts having different power levels.

In some embodiments, the modulated signal frame may carry a PLCP header in which a "Reserved" field may be used to indicate whether the message the modulated signal frame includes at least two modulated parts having different power levels.

In some embodiments, a "RATE" field of the PLCP header may include information indicating coding rate of the first bit sequence.

According to one embodiment, a system for receiving a message through a communication network is provided. The message is partitioned into at least two parts each of which is carried in a corresponding modulated part of a first modulated signal frame, and the at least two modulated parts of the first modulated signal frame have different power levels. The system may include a receiver for receiving the first modulated signal frame carrying the message through the communication network. The system further includes a processor configured to: obtain control information of the message from the first modulated signal frame received by the receiver; and control obtaining the message carried in the first modulated signal frame based on the control information, which may include: controlling a demodulator and a decoder to demodulate and decode the first modulated signal frame as it only has one modulated part to obtain a first part of the message; controlling an encoder and a modulator to encode and modulate the first part of the message to obtain a second modulated signal frame; controlling the demodulator and the decoder to demodulate and decode a third modulated signal frame which is a difference between the first modulated signal frame and the second modulated signal frame, as the third modulated signal frame has only one modulated part, to obtain a second part of the message; and controlling the demodulator, the decoder, the encoder and the modulator to repeat the above processes for a corresponding number of times until all the at least two parts of the message are obtained, where the corresponding number may be determined based on the control information.

In some embodiments, the control information may include the number of the at least two parts of the message, types of data respectively contained in the at least two parts of the message, power levels respectively corresponding to the at least two parts of the message, and the like.

In some embodiments, the processor may be further configured to; determine whether each of the obtained at least two parts of the message has an error; if none of the obtained at least two parts of the message is determined to have an error, combine the obtained at least two parts of the message based on the control information; and transmit a combination result to an application layer. In some embodiments, the processor may be configured to: if one of the at least two parts of the message is determined to have an error, transmit the rest part of the message which is determined to have no error to the application layer.

In some embodiments, the communication network is a vehicular communication network, the processor may be configured to obtain the control information of the message based on a PLCP header which may be partially carried in a "SIGNAL" part of the first modulated signal frame.

In some embodiments, the processor may be configured to obtain the control information of the message based on message type information contained in the PLCP header and a configuration file listing out various message types and their corresponding control information.

In some embodiments, the processor may be configured to determine whether the message is partitioned into at least two parts based on a "Reserved" field of the PLCP header; and if yes, perform the above described processes to obtain the at least two parts of the message.

In some embodiments, the processor may be configured to obtain the third modulated signal frame based on vector subtraction between the first modulated signal frame and the second modulated signal frame.

In one embodiment, a method for extracting a message from a received signal frame is provided. The method may include: receiving a signal frame having N parts which are modulated with different power levels, where N is an integer equal to or greater than 2; demodulating and decoding the received signal frame to obtain N bit sequences which correspond to the N parts respectively; and forming a message based on the N bit sequences and a partition scheme according to which the message is partitioned into N message parts corresponding to the N bit sequences respectively.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Conventional communication methods may use TDRC modulation schemes at a transmitter side to reduce channel load. However, reliability of these communication methods may be affected because signal frames obtained from modulations with a high data rate may be easily affected by noise and interference, especially for receivers far away from the transmitter. Inventors found that, by modulating different parts of a message with different power levels based on importance of these parts, not only the transmission duration of the message may be reduced, but also at least the relatively important part of this message can be received easier.

Communication of a vehicle safety message through a communication network according to embodiments will be illustrated in detail hereunder. The vehicle safety message may be a BSM, cooperative awareness message (CAM) or decentralized environmental notification message (DENM), which is communicated through a vehicular communication network. Extensions to communicating other messages through other communication networks may be easily conceived in light of this disclosure.

Figure 1:
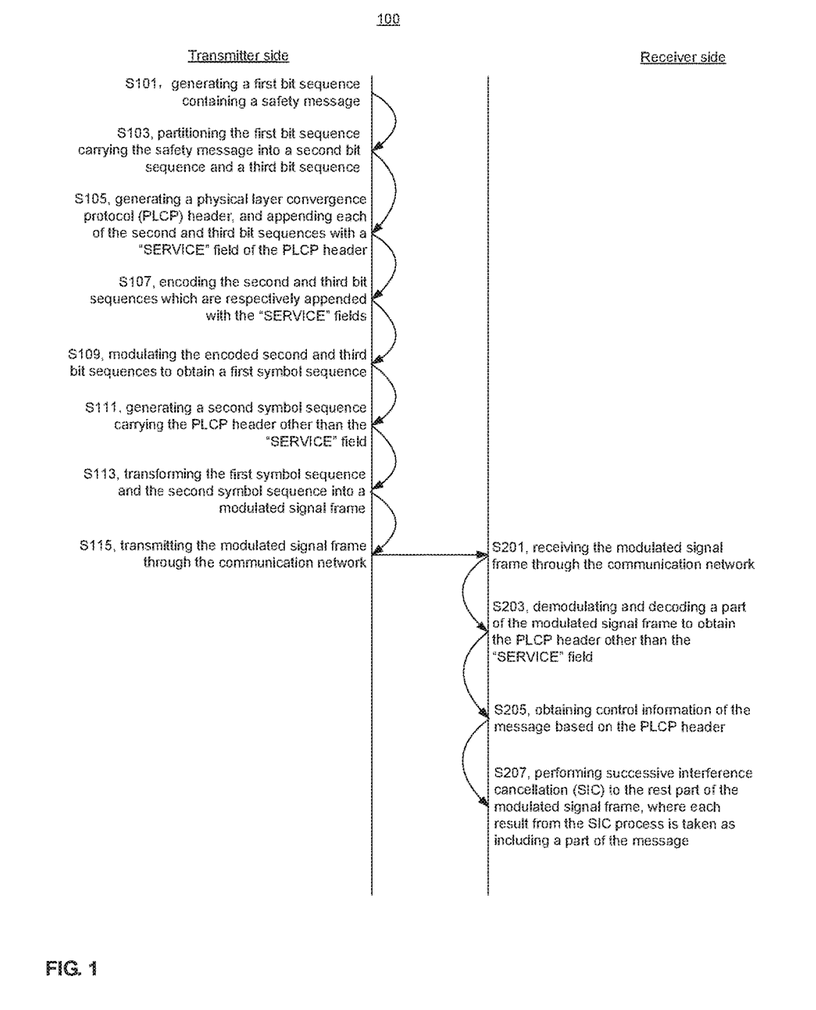
FIG. 1 schematically illustrates a flow chart of a method for communicating a safety message through a vehicular communication network according to one embodiment.

FIG. 1 schematically illustrates a flow chart of a method 100 for communicating a safety message through a vehicular communication network according to one embodiment. Referring to FIG. 1, in S101, generating a first bit sequence containing a safety message.

Medium access mechanism in wireless access in vehicular environments (WAVE) is defined as a commonly assumed physical layer communication mechanism based on IEEE 802.11p. According to the communication mechanism, data included in the safety message, e.g., global positioning system (GPS) data, sensor data, and the like, may be generated from applications in an application layer. Thereafter, the safety message data may be contained in a WAVE short message (WSM) data field and appended with headers in a WAVE short message protocol (WSMP) layer. The safety message appended with the WSMP headers may be then transmitted downwardly to lower layers, such as a logical link control (LLC) layer, a medium access control (MAC) layer, and the like, and appended with other headers in the lower layers. Such that, a bit sequence carrying the safety message, i.e., the first bit sequence, may be generated.

In S103, partitioning the first bit sequence carrying the safety message into a second bit sequence and a third bit sequence.

Each one of the second and third bit sequences may include a part of the safety message. Therefore, different contents of the safety message with different importance may be partitioned into different bit sequences. In some embodiments, the first bit sequence may be partitioned into more than two groups, and each of the groups may include a corresponding part of the safety message.

Different types of messages may be partitioned using different partition schemes. In some embodiments, a unit embedded at bottom of the MAC layer may be configured to partition the first bit sequence. Specifically, the unit may be configured to: determine type of the safety message; select a partition scheme based on the type of the safety message and a configuration file which lists out various safety message types and their corresponding partition schemes; and partition the safety message according to the selected partition scheme to obtain the second bit sequence and the third bit sequence.

In some embodiments, the first bit sequence may include a data field indicating the message type, such that the message type can be determined based on a value of such data field. In such ways, the message type may be determined, for example, the safety message contained in the first bit sequence may be determined to be a BSM.

Thereafter, the partition scheme may be selected based on the identified message type. In some embodiments, a configuration file listing out a plurality of partition schemes corresponding to various message types respectively may be stored in the unit. By reading the configuration file, how to partition the first bit sequence may be determined based on the type of the safety message carried in the first bit sequence.

Figure 2:
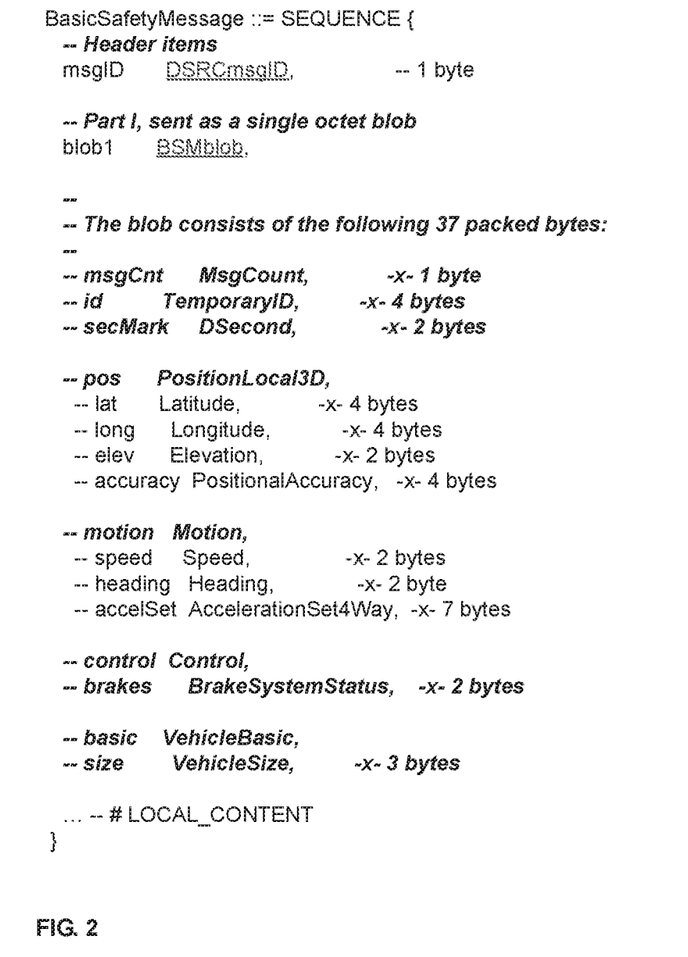
FIG. 2 illustrates contents in a BSM.
Figure 3:
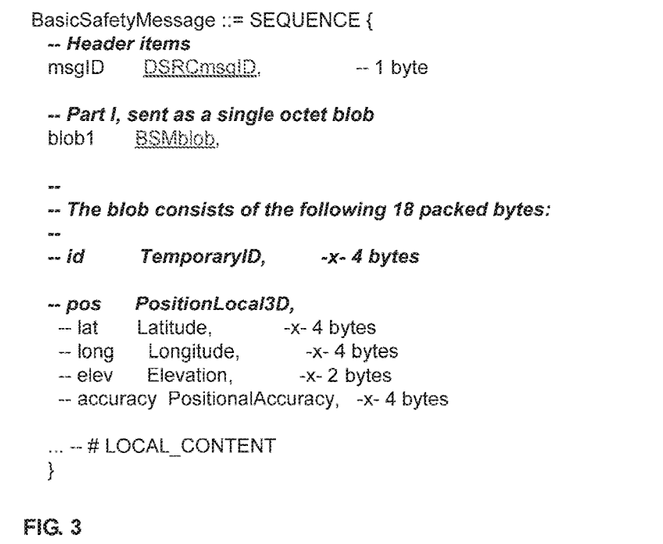
FIG. 3 illustrates a first subpart of the BSM according to one embodiment.
Figure 4:
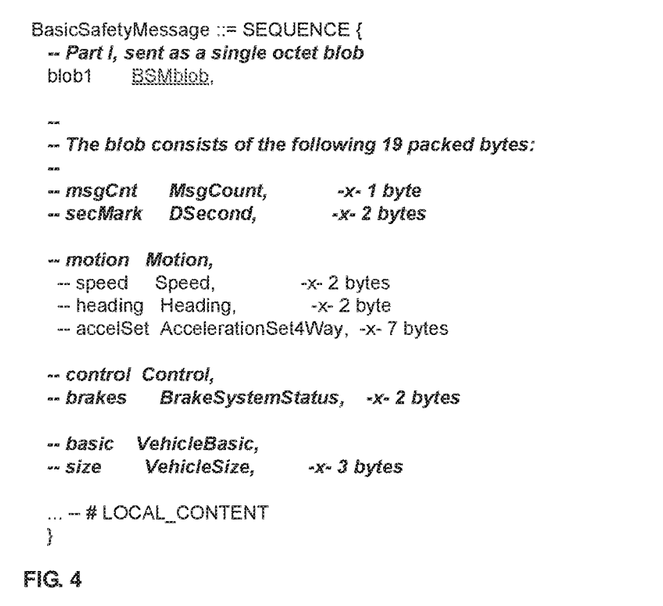
FIG. 4 illustrates a second subpart of the BSM according to one embodiment.

Hereunder gives an example of partitioning a BSM. FIG. 2 illustrates contents in a BSM. It could be seen from FIG. 2 that the BSM may include position data which are most essential for collision avoidance applications. Other data in the BSM, such as speed, heading, acceleration, brake state and size, may be less important. Accordingly, in some embodiments, if the safety message is determined to be a BSM, contents including the position data, as illustrated in FIG. 3, may be grouped as a first part of the BSM; and the rest contents, as illustrated in FIG. 4, may be grouped as a second part of the BSM. In some embodiments, the partition scheme for the BSM may be altered, for example, speed, heading and acceleration data may be grouped into the first part together with the position data.

The configuration file may be parameterized, which means the partition schemes corresponding to the message types may be adjusted based on practical requirements. Besides, the configuration file can be updated to include other partition schemes for new message types.

As stated above, the first bit sequence may include header data; such as WSMP headers, LLC headers and/or MAC headers. Regarding the header data, there may be several solutions to partition them. In some embodiments, the header data may be grouped into either the first bit sequence or the second bit sequence. In some embodiments, the header data may be partitioned into two portions, where the first portion of the header data may include relatively important data and may be grouped into the first bit sequence with the first part of the safety message which may contain more important contents, and the second portion of the header data may include relatively less important data and may be grouped into the second bit sequence with the less important second part of the safety message.

Based on the partition scheme, the first bit sequence may be partitioned to obtain the second and third bit sequences. In subsequent modulations, the second and third bit sequences may need to have the same length. Therefore, in some embodiments, if the second and third bit sequences do not have the same length, pad bits may be added to the shorter one of the second and third bit sequences to make them have the same length. However, adding pad bits may be optional, since an identical length of the second and third bit sequences may be achieved using different encoding rates.

In some embodiments, the unit may be embedded in another layer higher than the MAC layer. However, if the first bit sequence is partitioned in the MAC layer, the partition scheme may cover more header data appended to the safety message.

In S105, generating a PLCP header, and appending each of the second and third bit sequences with a "SERVICE" field of the PLCP header.

A signal frame to be transmitted may carry the message together with some basic information of the message, such that a receiver may demodulate and decode the signal frame to obtain the message based on the basic information. In vehicular communications, according to IEEE 802.11p, the basic information may be contained in a PLCP header. Specifically, a "SERVICE" field of the PLCP header may be encoded and modulated with the message to form a "DATA" part of a modulated signal frame, while other data fields of the PLCP header may be encoded and modulated to form a "SIGNAL" part of the modulated signal frame.

The PLCP header generated in S105 may indicate that the safety message is partitioned and different power levels are allocated to different parts of the safety message, such that receivers may use suitable demodulation and/or decoding schemes accordingly. Therefore, in some embodiments, spare bits in the PLCP header may be used to indicate this information.

Figure 5:
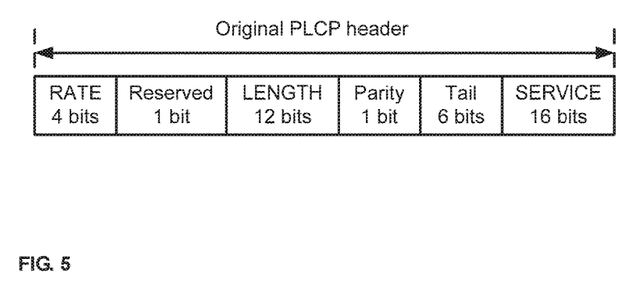
FIG. 5 illustrates an original structure of a PLCP header according to IEEE 802.11p.
Figure 6:
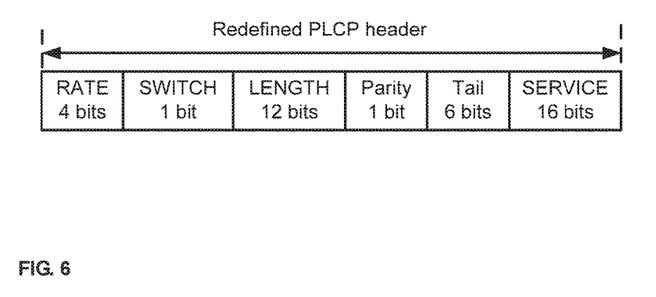
FIG. 6 illustrates a redefined PLCP header according to one embodiment.

FIG. 5 illustrates an original structure of a PLCP header according to IEEE 802.11p, FIG. 6 illustrates a redefined PLCP header according to one embodiment. Referring to FIGS. 5 and 6, a 1-bit "Reserved" field, which is originally default, may be utilized as a "SWITCH" identifier for indicating whether the safety message is partitioned. For example, the 1-bit in the "Reserved" field may be assigned to be "0" according to IEEE 802.11p, once the 1-bit in the "Reserved" field turns to be "1", it may mean that the "Reserved" field has been used as a "SWITCH" identifier indicating that the safety message is partitioned. A receiver may select a suitable way to demodulate and decode based on the "SWITCH" identifier.

Furthermore, some redefinitions of the PLCP header may be implemented. For example, a "RATE" field should originally, according to IEEE 802.11p, represent the coding rate of data appended with the "RATE" field. In some embodiments, the "RATE" field in the redefined PLCP header may represent a coding rate of the second bit sequence. Since different coding rates may be used for the second and third bit sequences, in some embodiments, the "SERVICE" field may include data indicating a coding rate of the third bit sequence.

At receiver side, data in the "SIGNAL" part may be obtained before data in the "DATA" part is obtained, such that the basic information contained in the PLCP header, especially the coding rate, payload length of the "DATA" part, can be obtained. After demodulating and decoding the "DATA" part based on the basic information to obtain the second bit sequence and the "SERVICE" field, the coding rate of the third bit sequence contained in the "SERVICE" field may be known. Thereafter, demodulation and decoding may be performed to obtain the third bit sequence.

In S107, encoding the second and third bit sequences which are respectively appended with the "SERVICE" fields.

According to IEEE 802.11p, there are several encoding schemes with different encoding rates can be selected. Through a proper forward error correction (FEC) encoder with different coding rates, the lengths of the encoded second and third bit sequences may be adjusted to be equal to each other, even if the second and third bit sequences do not have the same length before they are encoded.

In S109, modulating the encoded second and third bit sequences to obtain a first symbol sequence.

The symbol sequence may include a first modulated part corresponding to the encoded second bit sequence and a second modulated part corresponding to the encoded third bit sequence. Besides, the first modulated part may have a power level greater than that of the second modulated part.

Allocating different powers to the first and second modulated parts may ensure that the first modulated part carrying the more important part of the safety message and more important portion of the header data can be demodulated and decoded more easily. There may be several practical schemes for modulating the encoded second and third bit sequences. In some embodiments, the encoded second and third bit sequences may be separately modulated to obtain the first and second modulated parts having different power levels. For example, using an unequal error protection (UEP) method, the first and second modulated parts can be allocated with different powers. Thereafter, the first and second modulated parts may be combined to form the first symbol sequence. In some embodiments, the first and second modulated parts may be combined using superposition coding. In some embodiments, the encoded second and third bit sequences may be modulated using a scalable modulation, such that the first symbol sequence may include the first and second modulated parts having different power levels. Detail information of the above described schemes may be obtained by referring to "Superposition Coding in the Downlink of CDMA Cellular Systems" (written by S. Bopping et al., and published in "Wireless Communications and Networking Conference, 2006"), "Optimizing the Energy of Different Bitstreams of Turbo Code" (written by J. Hokfelt et al., and published in "Turbo Coding Seminar Proc., pp 59-63, 1996"), and "Scalable Modulation for Scalable Wireless Videocast" (written by L. Cai et al., and published in "INFOCOM, 2010 Proceedings IEEE").

Hereunder gives a specific example for illustrating modulation with UEP, in which superposition coding of quadrature phase shift keying (QPSK) modulation constellations is used. Other modulation constellations and other UEP schemes could be also applied in the similar way as follows.

Figure 7:
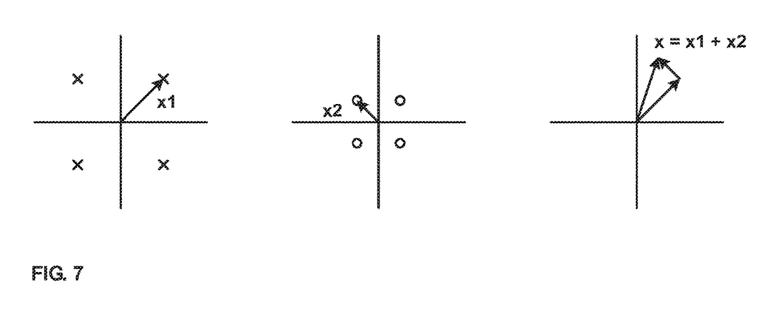
FIG. 7 schematically illustrates superposition coding of two QPSK modulation constellations.

FIG. 7 schematically illustrates superposition coding of two QPSK modulation constellations. Referring to FIG. 7, two bits in the encoded second bit sequence may be mapped into a first QPSK modulation constellation to obtain a first symbol $x_1$, while two bits in the encoded third bit sequence may be mapped into a second QPSK modulation constellation to obtain a second symbol $x_2$. Vector superposition may be performed on $x_1$ and $x_2$ to obtain a high-order symbol x. Since $x_1$, representing more important contents, may be allocated with higher power, while $x_2$, representing less important contents, may be allocated with lower power, the combined high-order symbol x may be much closer to the first symbol $x_1$ than to the second symbol $x_2$. It could be understood that the first symbol $x_1$ is more likely to be demodulated and decoded at the receiver side, thus it may have a higher possibility to obtain the two bits corresponding to the first symbol $x_1$. Allocating distinct power to different bit sequences may be simply achieved by adjusting a power transfer distribution factor (PTDF) "α", where the power allocated to the encoded second bit sequence may be α*P, the power allocated to the encoded third bit sequence may be (1-α)*P, and a is greater than 0.5. Other bits in the encoded second and third bit sequences may be modulated in the same way, so that a symbol sequence, i.e., the first symbol sequence, may be generated.

The first symbol sequence may constitute a "DATA" part of a signal frame to be transmitted.

In S111, generating a second symbol sequence carrying the PLCP header other than the "SERVICE" field.

According to IEEE 802.11p, a modulation scheme for the PLCP header other than the "SERVICE" field is fixed. Using that scheme, the second symbol sequence, which constitutes a "SIGNAL" part of the signal frame to be transmitted, is formed.

In S113, transforming the first symbol sequence and the second symbol sequence into a modulated signal frame.

In some embodiments, the first symbol sequence and the second symbol sequence may be subjected to orthogonal frequency division multiplexing (OFDM) modulation followed by digital-to-analogue conversion, which is well known in the art. Such that, the first symbol sequence and the second symbol sequence may be transformed from frequency domain into time domain to obtain a time domain discrete signal frame, and the time domain discrete signal frame may be transformed into a time domain continuous signal frame.

In S115, transmitting the modulated signal frame through the communication network.

A transmitter may be controlled to transmit the time domain continuous signal frame at a predetermined frequency through the vehicular communication network.

S101 to S115 may be performed in a vehicle. Then the modulated signal frame may be received by another vehicle.

In S201, receiving the modulated signal frame through the communication network.

Receiving the signal may be implemented by a receiver in a physical layer of a receiver. Theoretically, all neighboring vehicles within the transmission range may receive the signal. However, in practise, signal transmission may be blocked by obstacles. Besides, the received modulated signal frame may be corrupted by noise and interference.

In S203, demodulating and decoding a part of the modulated signal frame to obtain the PLCP header other than the "SERVICE" field.

As stated above, the "SIGNAL" part of the modulated signal frame may be preferentially demodulated and decoded to obtain the control information contained in the PLCP header. Multiple iterations may be performed to ensure correct decoding of the second part.

It should be noted that, after the modulated signal frame is received, analogue-to-digital conversion, synchronization, fast Fourier transform, and the like may be performed to transform the received modulated signal frame, which may be a time domain continuous signal frame, into the first symbol sequence and the second symbol sequence. Such that, the second symbol sequence, i.e., the "SIGNAL" part, may be demodulated and decoded to obtain information in the PLCP header.

In S205, obtaining control information of the message based on the PLCP header.

In some embodiments, the control information may include the number of parts of the message, types of data respectively contained in the at least two parts of the message, power levels respectively corresponding to the at least two parts of the message, and the like. Based on the control information, the data carried in the modulated signal frame may be obtained, recognized and used at the receiver side.

In some embodiments, a configuration file may be established in the physical layer, which lists out various message types and their corresponding control information. Since the message type may be obtained based on the PLCP header, the corresponding control information may also be obtained.

In some embodiments, the control information may further include an identifier indicating whether the message has been partitioned at the transmitter side. In some embodiments, the bit in the "Reserved" field of the decoded first PLCP header may be used as the identifier. For example, if the bit in the "Reserved" field of the decoded first PLCP header is "1", it may be determined that the message has been partitioned. If yes, then goes to S207; if no, the rest part of the modulated signal frame, i.e., the first symbol sequence, may be demodulated and decoded as normal.

In S207, performing successive interference cancellation (SIC) to the rest part of the modulated signal frame, where each result from the SIC process is taken as including a part of the message.

Each result from the SIC process is taken as including a part of the message. SIC is commonly used in the art to demodulate and decode a signal when superposition coding is applied during generation of the signal. Specifically, the first symbol sequence may be demodulated and decoded based on the coding rate information in the "RATE" field of the decoded PLCP header. As stated above, symbols in the first symbol sequence may be closer to symbols corresponding to the encoded second bit sequence containing more important contents than to symbols corresponding to the encoded third bit sequence containing less important contents. Therefore, normally the second bit sequence could be obtained more easily. If the decoded second bit sequence includes an error according to a FCS check result, which means the modulated signal frame may be heavily corrupted, the whole received information may be discarded. If the decoded second bit sequence doesn't include an error according to the FCS check result, the decoded second bit sequence together with the decoded "SERVICE" part may be encoded and modulated again as a same way at the transmitter side to obtain a third symbol sequence. Thereafter the third symbol sequence may be removed from the first symbol sequence using vector subtraction to obtain a fourth symbol sequence. As described above, the first symbol sequence may be obtained by combining symbols represents the encoded second and third bit sequences using vector superposition. Therefore, the third bit sequence may be obtained by demodulating and decoding the fourth symbol sequence.

If the decoded third bit sequence also passes the FCS check, which means both the first part of the message carried in the second bit sequence and the second part of the message carried in the third bit sequence are received, both the decoded second bit sequence and the decoded third bit sequence may be used in an application layer for further analyzing. In some embodiments, the obtained bit sequences containing the parts of the message may be combined based on the control information of the message to obtain the complete first bit sequence, and the first bit sequence may be transmitted to the application layer. If the decoded third bit sequence fails the FCS check, only the decoded second bit sequence may be transmitted to the application layer. The data transmitted to the application layer can be recognized based on the control information.

In some embodiments, the message may be partitioned into more than two parts, where the number of the parts is known based on the control information. In such scenario, the above processes in S207 may be repeated until all the parts of the message are obtained. For example, if the control information indicates that the message has been partitioned into N parts, the above processes may be repeated for another (N−2) times.

By applying the method 100, transmission efficiency may be increased as high-order modulation is applied, while at least transmission reliability of the first bit group including more important information may be improved.

Figure 8:
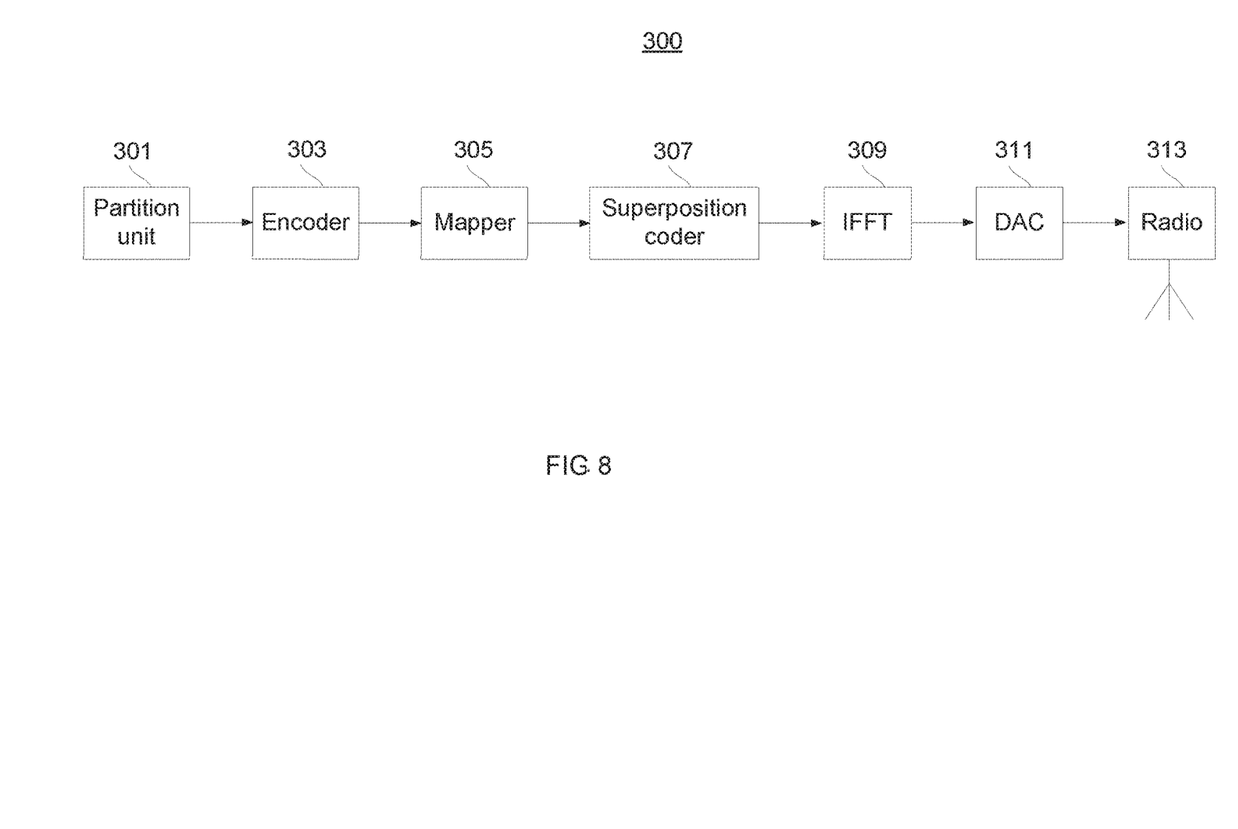
FIG. 8 schematically illustrates a block diagram of a system 300 for transmitting a message through a communication network.

According to one embodiment, a system 300 for transmitting a message through a communication network is provided. The system 300 may be at a transmitter side. FIG. 8 schematically illustrates a block diagram of the system 300.

Referring to FIG. 8, the system 300 may include a partition unit 301 for partitioning the message into at least two parts and generating at least two bit sequences each of which carries a corresponding part of the message. The partition unit 301 may be embedded in a MAC layer of the transmitter and may partition the message based on pre-stored partition schemes respectively corresponding to various types of messages. In some embodiments, the partition unit 301 may append the at least two parts of the message with different header data of different importance, respectively, to generate the at least two bit sequences. In some embodiments, the message may be a vehicle safety message communicated in a vehicular communication network, the partition unit 301 may generate a PLCP header which may contain information indicating that the message is partitioned and different power levels are allocated to different parts of the message during modulation. A "SERVICE" field of the PLCP header may be inserted to each of the at least two bit sequences. In some embodiments, the partition unit 301 may add padding to the at least two parts of the message appended with header data, such that the at least two bit sequences may have the same length. Thereafter, the at least two bit sequences and the rest part of the PLCP header may be encoded.

The system 300 may include an encoder 303, such as a FEC encoder, or the like. The encoder 303 may encode the at least two bit sequences and the rest part of the PLCP header, respectively. In some embodiments, the encoder 303 may be configured to encode the at least two parts of the message appended header data using different coding rates, such that the at least two bit sequences may have the same length.

Detail configurations of the partition unit 301 and the encoder 303 may be obtained by referring to above descriptions for S101 to S107.

The system 300 may include a modulator for modulating the at least two bit sequences to form a modulated signal frame. The modulated signal frame may include at least two modulated parts corresponding to the at least two bit sequences, respectively, where the at least two modulated parts of the modulated signal frame have different power levels. In some embodiments, the modulator may include a mapper 305 for mapping the at least two bit sequences into constellations with different power levels to obtain the at least two modulated parts having different power levels, and the modulator may further include a superposition coder 307 for combining the at least two bit sequences to form the modulated signal frame. In some embodiments, the modulator may apply other modulation mechanism, such as a UEP method, for modulating the at least two bit sequences. In some embodiments, the modulator may further include an inverse fast Fourier transformer (IFFT) 309 and a digital-to-analogue converter (DAC) 311 to transform the modulated signal frame into a time domain continuous signal frame. Detain configurations of the modulator may be obtained by referring to above descriptions for S109 and S113.

The system 300 may include a radio 313 for transmitting the modulated signal frame through the communication network. In some embodiments, the radio 313 may be configured to transmit the time domain continuous signal frame at a predetermined frequency.

Figure 9:
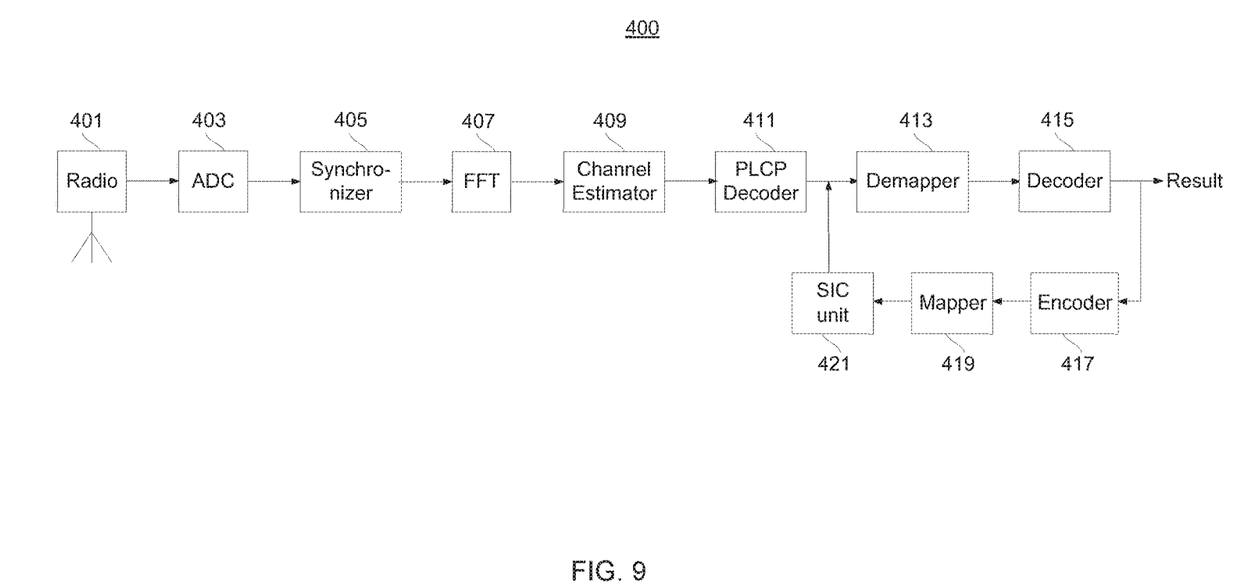
FIG. 9 schematically illustrates a block diagram of a system 400 for receiving a message through a communication network.

According to one embodiment, a system 400 for receiving a message through a communication network is provided. The system 400 may be at a receiver side. FIG. 9 schematically illustrates a block diagram of the system 400.

Referring to FIG. 9, the system 400 may include a radio 401 for receiving a first modulated signal frame carrying the message through the communication network from a transmitter through the communication network. The message may have been partitioned into at least two parts each of which is carried in a corresponding modulated part of a first modulated signal frame, and the at least two modulated parts of the first modulated signal frame may have different power levels. Then the received first modulated signal frame may go to an analogue-to-digital convertor (ADC) 403, a synchronizer 405, a fast Fourier transformer (FFT) 407, a channel estimator 409, etc, for certain processing, such that a first symbol sequence carrying the message may be obtained. Above processing is well known in the art and will not be illustrated in detail here.

The system 400 may include a PLCP decoder 411 for obtaining control information of the message, which may normally be contained in a PLCP header carried in a part of the first symbol sequence. In some embodiments, the control information may include the number of the at least two parts of the message, types of data respectively contained in the at least two parts of the message, power levels respectively corresponding to the at least two parts of the message, and the like. After obtaining the control information, whether the message is partitioned and different parts of the partitioned message are carried in different modulated parts of the first modulated signal frame having different power levels may be determined based on the control information.

If the determination is "no", following demodulation and decoding processes may be implemented according to corresponding standards, for example, according to IEEE 802.11p if the message is a vehicle safety message communicated in a vehicular communication network. If the determination is "yes", the rest part of the first symbol sequence carrying the message may be processed as follows.

Specifically, the system 400 may include a demapper 413 and a decoder 415 for demodulating and decoding the rest part of the first symbol sequence as it only has one modulated part. As stated above, the message is partitioned into at least two parts, and the at least two parts of the message are carried in at least two modulated parts having different power levels. It could be understood that the rest part of the first symbol sequence may be close to a modulated part with a higher power level. Therefore, a first result obtained from the decoder 415 may correspond to a first part of the message carried in the modulated part with the higher power level. Normally, the first part of the message may contain more important contents of the message, such that at least the more important contents of the message may be obtained better and easier.

Thereafter, the first result may be encoded and modulated by an encoder 417 and a mapper 419 to obtain a second symbol sequence. Using an SIC unit 421, a third symbol sequence which is a difference between the rest part of the first symbol sequence and the second symbol sequence may be obtained, which difference may correspond to a second part of the message. Thereafter, the third symbol sequence may be demodulated and decoded by the demapper 413 and the decoder 415 to obtain a second result corresponding to the second part of the message.

Processing of the demapper 413, the decoder 415, the encoder 417, the mapper 419 and the SIC unit 421 may be recycled until all parts of the message are obtained.

The system 400 may further include a unit (not illustrated in FIG. 9) for extracting information from the obtained results based on a partition scheme according to which the message is partitioned. The extracted information may be used by other components of the receiver for further processing.

Detail configurations of components in the system 400 may be obtained by referring to above descriptions for S201 and S207.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software; and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for receiving a message through a communication network, where the message is partitioned into at least two parts each of which is carried in a corresponding modulated part of a first modulated signal frame, and the at least two modulated parts of the first modulated signal frame have different power levels, the method comprising:
   receiving the first modulated signal frame;
   obtaining control information of the message from the first modulated signal frame; and
   obtaining the message carried in the first modulated signal frame based on the control information by:
     demodulating and decoding the first modulated signal frame as it only has one modulated part to obtain a first part of the message,
     encoding and modulating the first part of the message to obtain a second modulated signal frame,
     demodulating and decoding a third modulated signal frame which is a difference between the first modulated signal frame and the second modulated signal frame, as the third modulated signal frame has only one modulated part, to obtain a second part of the message, and
     repeating the above processes for a corresponding number of times until all the at least two parts of the message are obtained, where the corresponding number is determined based on the control information.

2. The method according to claim 1, further comprising:
   determining that none of the obtained at least two parts of the message is has an error;
   combining the obtained at least two parts of the message based on the control information; and
   transmitting a combination result to an application layer.

3. The method according to claim 1, wherein the control information of the message is obtained based on type of the message and a configuration file listing out various message types and their corresponding control information.

4. A system for receiving a message through a communication network, where the message is partitioned into at least two parts each of which is carried in a corresponding modulated part of a first modulated signal frame, and the at least two modulated parts of the first modulated signal frame have different power levels, the system comprising a receiver for receiving a first modulated signal frame carrying the message through the communication network, and a processor, wherein the processor is configured to:
  obtain control information of the message from the first modulated signal frame received by the receiver; and
  control obtaining the message carried in the first modulated signal frame based on the control information by:
    controlling a demodulator and a decoder to demodulate and decode the first modulated signal frame as it only has one modulated part to obtain a first part of the message,
    controlling an encoder and a modulator to encode and modulate the first part of the message to obtain a second modulated signal frame,
    controlling the demodulator and the decoder to demodulate and decode a third modulated signal frame which is a difference between the first modulated signal frame and the second modulated signal frame, as the third modulated signal frame has only one modulated part, to obtain a second part of the message, and
    controlling the demodulator, the decoder, the encoder and the modulator to repeat the above processes for a corresponding number of times until all the at least two parts of the message are obtained, where the corresponding number is determined based on the control information.

5. The system according to claim 4, wherein the processor is further configured to:
  determine that none of the obtained at least two parts of the message is has an error;
  combine the obtained at least two parts of the message based on the control information; and
  transmit a combination result to an application layer.

6. The system according to claim 4, wherein the processor is configured to obtain the control information of the message based on type of the message and a configuration file listing out various message types and their corresponding control information.

* * * * *

UNITED STATES PATENT AND TRADEMARK OFFICE
CERTIFICATE OF CORRECTION

PATENT NO. : 10,225,807 B2  
APPLICATION NO. : 15/997629  
DATED : March 5, 2019  
INVENTOR(S) : Zeng Yang et al.

Page 1 of 1

It is certified that error appears in the above-identified patent and that said Letters Patent is hereby corrected as shown below:

On the Title Page

Please insert:
--(73) Assignee: HARMAN INTERNATIONAL INDUSTRIES, INCORPORATED,
          Stamford, CT (US)--;

(62) Related U.S. Application Data:
Please delete "Division of application No. 15/024,227, filed as application No. PCT/CN2014/086299 on Sep. 11, 2014, now Pat. No. 10,009,855." and insert --Division of application No. 15/024,227, filed on Mar. 24, 2016, now Pat. No. 10,009,855, which is a 371 of application No. PCT/CN2014/086299, filed on Sep. 11, 2014.--.

Signed and Sealed this  
Twenty-fifth Day of June, 2019

Andrei Iancu  
*Director of the United States Patent and Trademark Office*